May 21, 1957 H. M. WAGNER 2,793,290

RECTANGULAR PULSE GENERATOR

Filed May 4, 1953 2 Sheets-Sheet 1

INVENTOR,
HERBERT M. WAGNER

BY

Harry M. Saragovitz

ATTORNEY

INVENTOR,
HERBERT M. WAGNER
BY Harry M. Saragovitz
ATTORNEY

United States Patent Office 2,793,290

Patented May 21, 1957

2,793,290

RECTANGULAR PULSE GENERATOR

Herbert M. Wagner, Asbury Park, N. J., assignor to the United States of America as represented by the Secretary of the Army Application May 4, 1953, Serial No. 353,026

2 Claims. (Cl. 250—27)

(Granted under Title 35, U. S. Code (1952), sec. 266)

The invention described herein may be manufactured and used by or for the Government for governmental purposes, without the payment of any royalty thereon.

This invention relates to new and useful circuits using gas filled tubes for generating electrical pulses. Its principal object is to generate rectangular pulses of excellent shape. Another object is to provide a pulse generator with simplified circuitry and reliable performance that avoids the need for a pulse forming network and charging circuits as ordinarily used in conjunction with conventional line type pulsers. A further object is to produce a pulse of calibrated and monitored amplitude and of variable pulse width and repetition rate.

This is accomplished by providing a source of potential connected thru a control resistance and a load resistance to a first gaseous discharge tube. When this tube operates the pulse is started. Another source of higher potential, ordinarily made up in part from the first source, connected, thru the same resistance or another impedance coupled to it, to a second gaseous discharge tube, serves to drop the potential of the first source and resistor enough to deionize the first tube. Sources of potential usually may involve the direct use of batteries; however, to limit fault energy or duration of some portions of the cycle of operation, it is common to provide a capacitor charged from the battery thru a resistance. This also has the advantage in some circuits that the potential across the capacitor may vary relative to the potential of the battery during the cycle of operation.

The invention will be more fully understood from the drawings in which.

Figure 1:
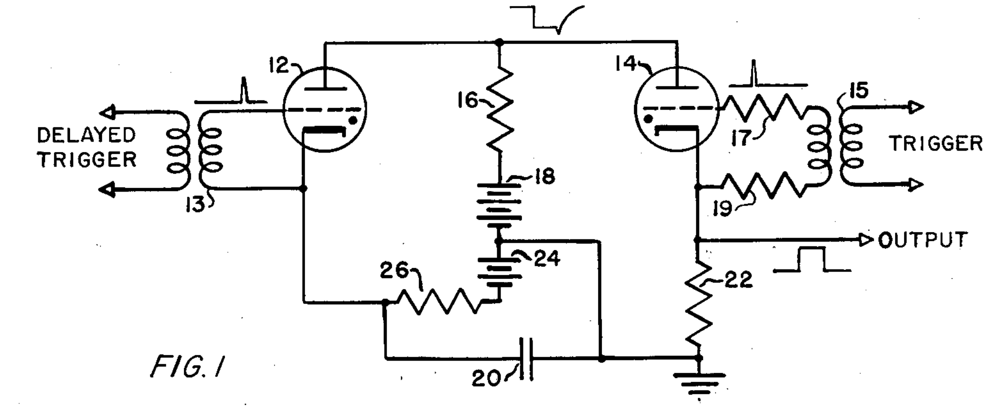
Figure 1 is a schematic drawing of one positive pulse generator circuit using two gas filled tubes.

Referring to the drawings, the schematic diagram of Figure 1 illustrates two grid controlled gas filled tubes 12, 14, generally referred to as thyratrons, having their anodes directly coupled and connected thru resistor 16 to a common anode voltage source 18. The cathode of tube 14 is connected thru the output resistor 22 to ground. The cathode of tube 12 is connected thru a capacitor 20 to ground, and a series combination of a battery 24 and a resistor 26 is in parallel with capacitor 20 to supply an additional voltage for tube 12.

An external trigger voltage is applied between the grid and cathode of tube 14 by a transformer 15 having current limiting resistors 17 and 19 in its secondary circuit causing tube 14 to conduct thereby starting the output pulse. A delayed trigger voltage, impressed between the grid and cathode of tube 12 by a similar transformer 13, fires tube 12 which has the charged capacitor 20 in its cathode circuit. The anode voltage on tube 14 drops to zero or a negative value with respect to its cathode and therefore tube 14 stops conducting and the output becomes zero. The rise and fall time of the output pulse, when a standard hydrogen thyratron is used, is of the order of $10^{-8}$ seconds. Tube 12 cuts off when capacitor 20 reverses in polarity enough to oppose the common voltage source 18, and reduce the current below that needed for maintaining ionization of tube 12, and the cycle of operation can then be repeated when capacitor 20 has charged again.

Figure 2:
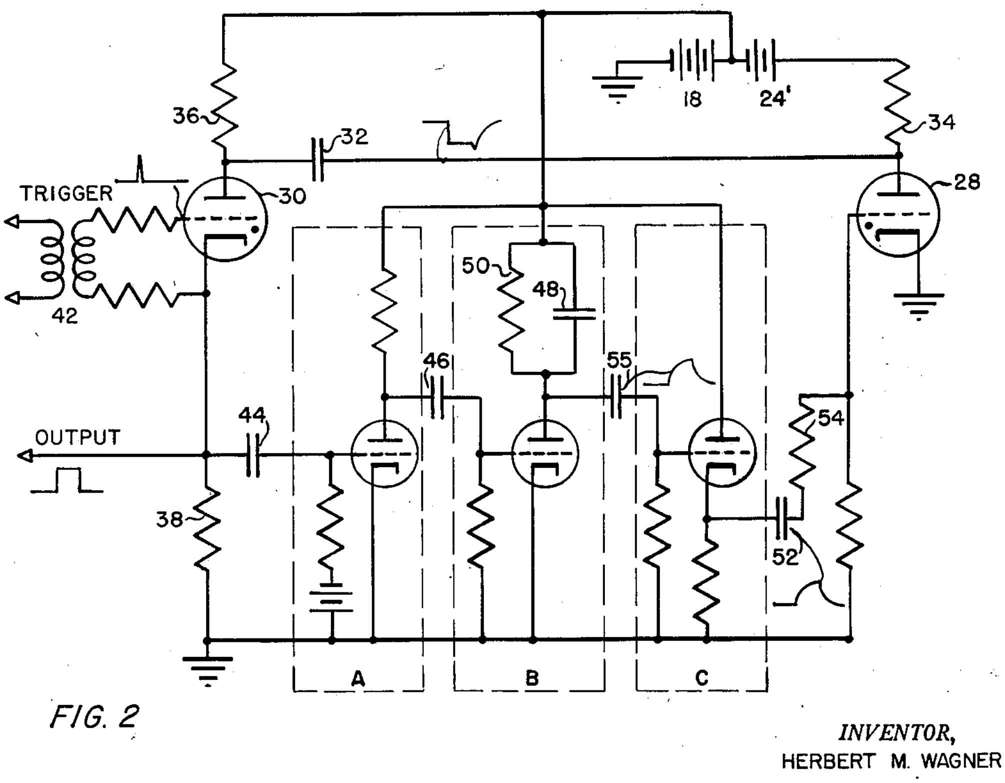
Figure 2 is another form of positive pulse generator circuit that also shows a triggering device.

Referring to Figure 2, the schematic diagram shows two grid controlled gas filled tubes 28, 30 with their anodes coupled by a capacitor 32. The anode of tube 30 is connected thru resistor 36 to a source of positive potential 18. The anode of tube 28 is connected thru resistor 34 to a source of higher positive potential 18 plus 24'. The cathode of tube 28 is grounded and an output resistor 38 is connected between ground and the cathode of tube 30. The secondary of a transformer 42 is connected between the grid and cathode of tube 30.

A positive trigger pulse is applied to the primary of the transformer 42 causing tube 30 to conduct and starting the output pulse. The output voltage across resistor 38 is applied thru a coupling capacitor 44 to the control grid of vacuum tube amplifier A. The plate output of this amplifier is applied thru a coupling capacitor 46 to the control grid of a delay stage B. The vacuum tube in this stage is conducting when no signal is on its grid and the capacitor 48 in its plate circuit is charged. When a negative signal is applied to its grid it is cut off; the voltage at the plate of stage B then increases as the capacitor 48 discharges. This voltage change is applied to the grid of the tube in stage C thru capacitor 55. When this voltage reaches a certain positive value, conduction in the tube in stage C increases substantially and thru a coupling capacitor 52 and resistor 54 a positive trigger voltage is applied to the grid of tube 28 causing it to conduct. Because of the plate voltage drop at tube 30 and the voltage across the capacitor 32, the plate voltage on tube 30 becomes zero or negative. Tube 30 is therefore cut off and the output voltage drops to zero; thus the output across resistor 38 is a rectangular pulse with a width controlled by the time constant of the RC circuit containing resistor 50 and capacitor 48. If resistor 34 is too high to maintain conduction of 28 it also is deenergized ready for a further operation.

Figure 3:
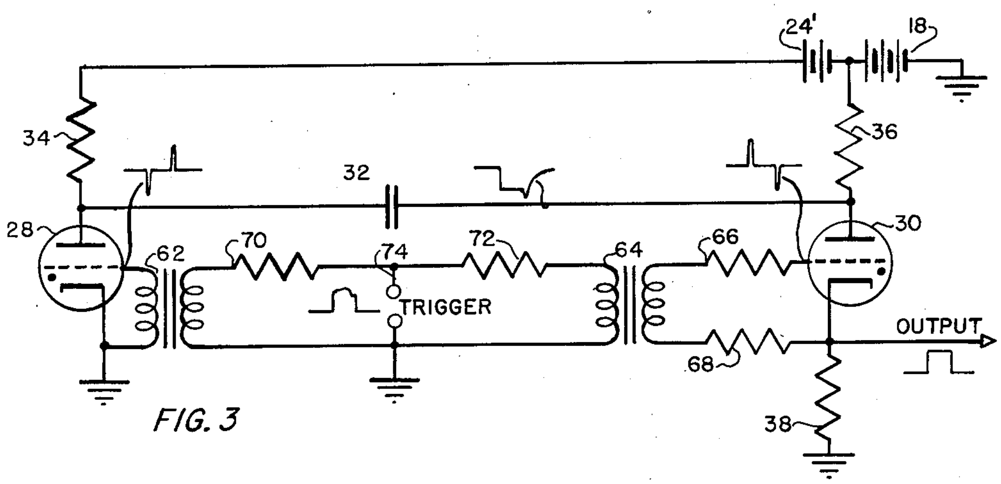
Figure 3 is substantially the same as Figure 2 with a different triggering circuit.

Referring to Figure 3, the schematic diagram shows another circuit, using two grid controlled gas filled tubes 28, 30, that is similar to Figure 2. The difference in the circuits is in the portion used for triggering. In Figure 3 the secondary of a transformer 62 is connected between ground and the grid of tube 28 and the secondary of a transformer 64 of opposite polarity to transformer 62 is connected thru resistors 66, 68 between ground and the grid of tube 30. One end of the primaries of transformers 62, 64 is grounded and the other end is connected thru resistors 70, 72 respectively to input terminal 74.

A trigger pulse is applied between terminal 74 and ground. The transformers 62, 64 are saturable at the voltage and pulse length used and therefore the secondary voltage of each transformer is a pulse of one polarity followed somewhat later by a pulse of opposite polarity. The time interval between these pulses is approximately the same as the width of the trigger pulse. The transformer connections are so arranged that the output pulses from them will be of opposite polarity with the first positive pulse on the tube 30 and the second on tube 28. The negative pulses appearing on the grids of the tubes have no effect, but the positive pulses serve to trigger tube 30 and then somewhat later to trigger tube 28. The positive pulse on the grid of tube 30 causes the tube to conduct and an output voltage appears across resistor 38. When the delayed positive pulse is impressed on the grid of tube 28 it conducts; the plate voltage drop at tube 28 and the voltage across the charged capacitor 32 causes a zero or negative plate voltage on tube 30. Tube 30 therefore ceases to conduct and the output voltage across resistor 38 drops to zero.

Figure 4:
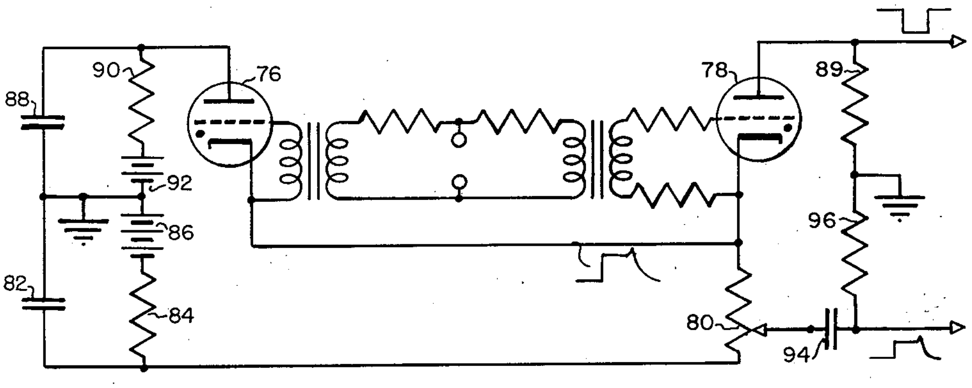
Figure 4 is another form of pulses generator circuit providing a square negative pulse but a distorted positive pulse.

Referring to Figure 4, the schematic diagram shows a circuit which generates a negative rectangular pulse and also a positive distorted pulse. The circuit consists of two gas filled grid controlled tubes 76, 78 with the cathodes directly connected. The cathodes are also connected to ground thru a potentiometer 80 and a capacitor 82. A series combination of a resistor 84 and a battery 86 is in parallel with capacitor 82. The plate of tube 76 is connected thru a capacitor 88 to ground. Connected in parallel with capacitor 88 is a series combination of a resistor 90 and a battery 92. The plate of tube 78 is grounded thru a resistor 89. The movable arm of the potentiometer 80 is connected to ground thru a capacitor 94 and a resistor 96 in series. The triggering circuit is the same as that shown in Figure 3 and therefore it will not be described here.

When a positive trigger pulse is applied to the grid of tube 78 it begins to conduct thus starting output pulses of opposite polarity across resistors 89, 96. When tube 76 begins to conduct, as a result of a positive pulse on its grid, the cathode potential of tube 78 rises and tube 78 is cut off. The output across resistor 89 becomes zero very quickly, but the output across resistor 96 decreases exponentially as capacitor 88 discharges until tube 76 is cut off and the cycle of operation can be repeated.

Figure 5:
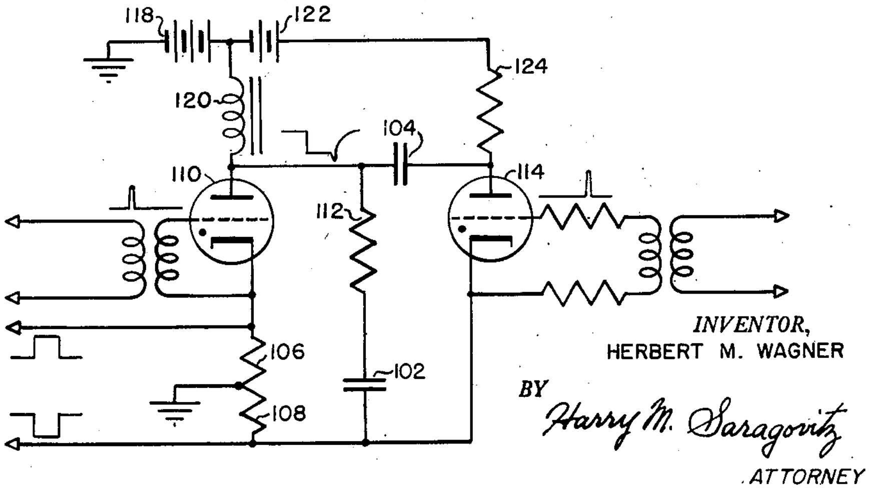
Figure 5 is a further form of circuit providing both positive and negative square pulse outputs.

In Figure 5 the load resistor is divided in two parts with resistor 106 connected from the reference point or ground to the cathode of tube 110 and resistor 108 connected between such reference point and the potential source, in this case a condenser 102. Resistor 112 in series with condenser 102 provides the necessary voltage drop in the source when the second thyratron 114 fires to terminate the pulse and discharge condenser 104. Since the circuit of thyratron 114 does not include either resistor 106 or 108, both the positive pulse on resistor 106 and negative pulse on resistor 108 are of square shape. The capacitor 102 serves as a first source charged by battery 118 thru impedance 120 and in combination with capacitor 104 charged by battery 122 thru resistor 124 serves as the second source. Since the batteries are loosely coupled to the pulse forming circuits, being used merely to charge capacitors 102 and 104, they may be grounded even though the output circuits are also grounded.

It has been assumed that the batteries are of low resistance and the necessary control resistance is in a separate element; in some cases the battery may be of substantial resistance or the equivalent rectifier may have a substantial resistance characteristic due to some cause such as reactance in its alternating current supply.

The impedance in the charging circuit from the second source of potential usually is made high enough to permit the current in the second tube to fall below that necessary to maintain ionization; therefore the second tube operates for only a short interval, enough to deenergize the first tube, and a distorted rectangular pulse is developed across the control resistance. If the control resistance and load resistance are connected to opposite main electrodes of the first tube this pulse is of opposite polarity to that of the load resistance.

Preferred embodiments of the invention have been described to facilitate an understanding of the features of the invention, but many further variations will be apparent to those skilled in the art. What is claimed is:

1. An electrical pulse generator comprising first and second ionic discharge tubes, each including two main electrodes and a control electrode, a saturable core inductive means, energized by a wide pulse to saturate during said wide pulse but to provide narrow pulses of opposite voltage at the beginning and end of said wide pulse, connected to said control electrodes in opposite polarity to provide narrow pulses of proper polarity to energize said first and then said second tube, said pulses of opposite voltage being ineffective to energize said tubes, a first source of potential connected thru control resistance means and load resistance means to said main electrodes of said first tube, a second source of potential connected, thru impedance means coupled to said control resistance means, to said main electrodes of said second tube, the potential of said second source being higher than the potential of said first source to deenergize said first tube when said second tube is energized, said second source comprising a capacitor having a charging circuit of sufficient impedance to permit the current in said second tube to fall below that necessary to maintain ionization whereby a rectangular voltage of duration equal to the interval between said control pulses is developed across said load resistance means.

2. An electrical pulse generator comprising first and second ionic discharge tubes, each including two main electrodes and a control electrode, means for applying control pulses sequentially to the control electrodes of said first tube and then said second tube to energize said tubes, a first source of potential connected thru first control resistance means and load resistance means to said main electrodes of said first tube, a second source of potential connected, thru a second control resistance means capacity coupled to said first control resistance means, to said main electrodes of said second tube, the potential of said second source being higher than the potential of said first source to deenergize said first tube when said second tube is energized, said second source comprising a capacitor having a charging circuit of sufficient impedance to permit the current in said second tube to fall below that necessary to maintain ionization in which a large capacitor is connected across both load resistance means and said first tube to act as the source of potential during said interval, whereby rectangular voltages of opposite polarity are generated across said resistance means.

References Cited in the file of this patent

UNITED STATES PATENTS

| | | |
|---|---|---|
| 1,691,395 | Langmuir | Nov. 13, 1928 |
| 2,147,472 | Ulrey | Feb. 14, 1939 |
| 2,162,508 | Knowles | June 13, 1939 |
| 2,221,569 | Berkey et al. | Nov. 12, 1940 |
| 2,301,195 | Bradford | Nov. 10, 1942 |
| 2,372,106 | Nagel | Mar. 20, 1945 |
| 2,486,703 | Bishop | Nov. 1, 1949 |